April 15, 1941.　　F. HARTWIG ET AL　　2,238,467
REMOTE CONTROL DEVICE
Filed Jan. 4, 1939

INVENTORS
FRITZ HARTWIG
OTTO OEHLING
BY
ATTORNEY

Patented Apr. 15, 1941

2,238,467

UNITED STATES PATENT OFFICE 2,238,467

REMOTE CONTROL DEVICE

Fritz Hartwig, Berlin-Oberschoneweide, and Otto Oehling, Berlin-Friedenau, Germany, assignors to General Electric Company, a corporation of New York Application January 4, 1939, Serial No. 249,220
In Germany January 10, 1938

2 Claims. (Cl. 74—10)

In the remote control or tuning of transmitters and receivers for radio communication, motor-driven tuning devices are frequently employed with a gear being interposed between the motor and the tuning device, the speed ratio of which is automatically changed from high speed to low speed, or vice versa, for the purpose to insure a brief setting time for low gearing and as accurate an adjustment as possible for high gearing. Gears and drives of this kind are known in the prior art, and as a general rule they operate in such a way that in low speed operation the drive of the tuning means is effected through the intermediary of a friction clutch which is caused to slip in the presence of high speed operation. The disadvantages of this embodiment are that the friction is not constant or stable, the friction pressure must be chosen so large that even under most unfavorable conditions safe driving will be insured. But this, in turn, is attended with greater wear and tear. The motor must be comparatively powerful if it is to provide, in high speed operation, not only the rapid rotation of the tuning means, but overcome in addition the friction set up in the slip coupling.

Figure 1:
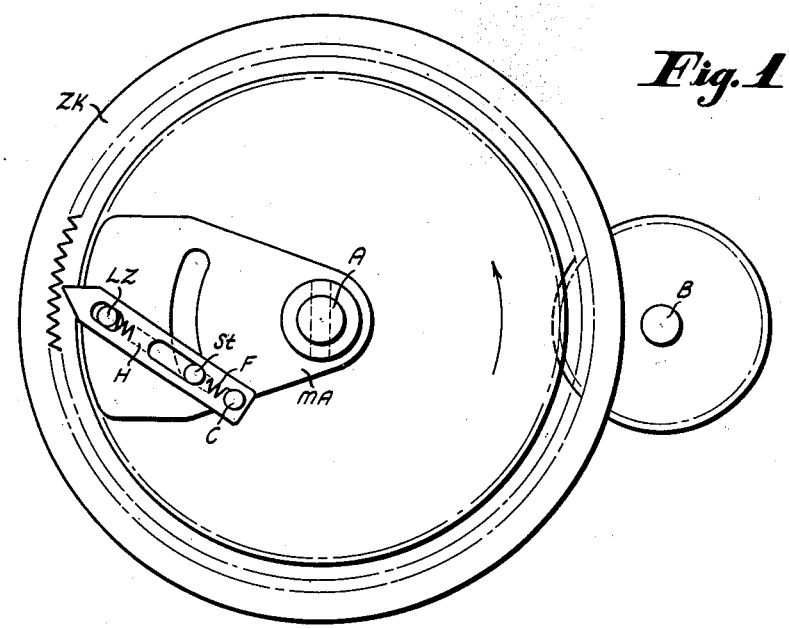
Figure 2:
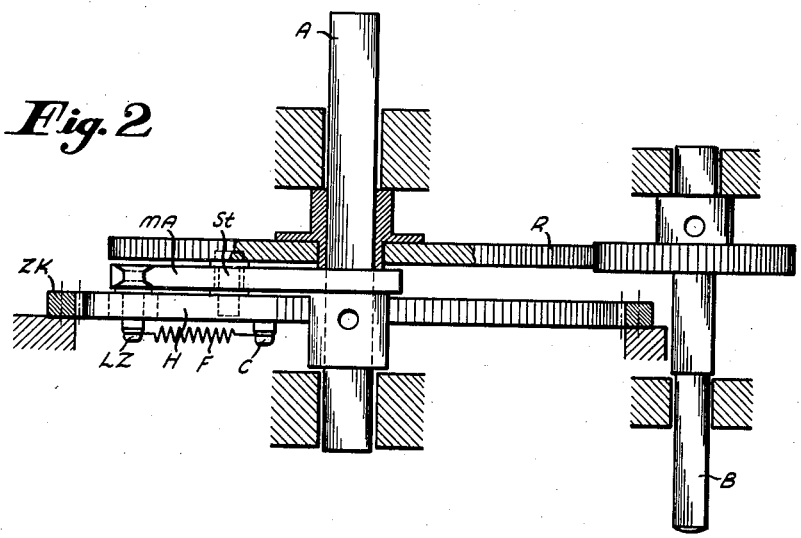

In the appended drawing Fig. 1 illustrates a plan view and Fig. 2 a part sectional view of a gear mechanism in which the said shortcomings have been obviated. The drive in low speed operation is here effected by the aid of a lever which only upon initiation of the low speed operation is caused to engage with a stationary toothed rim, while being out of mesh therewith during high speed rotation.

Referring to the drawing, A denotes a shaft which is in fixed coupling relation with the tuning device to be set. From the drive shaft B which is driven by a motor (not shown) the wheel R loosely seated upon the shaft is rotated. The drive pin St fixed in the wheel R protrudes through a transverse slot of the drive arm MA into a longitudinal slot of the lever H. MA is fixedly seated upon the shaft A. At its outer end it has a bearing pin LZ on which is supported the lever H with an oblong slot. A spring F which is held between the bearing pin or journal LZ and a pin C fixed on the lever H tends to pull the lever H always in a definite direction.

In the position as illustrated, the gear was last driven at high speed in the direction of the arrow. If, then, the sense of rotation of the motor is reversed, the wheel R will revolve in a direction contrary to that indicated by the arrow. First the shaft A stops. The drive pin St moves in the cross slot of the drive arm MA. Incidentally, the lever H which so far had been held out of engagement by the drive pin is thrown over and caused to mesh by action of the spring F with the stationary inside tooth rim ZK. Since the point of the lever H is arrested by the teeth, the lever will slowly turn upon further motion through St by way of the bearing pin LZ, the drive arm MA and thereby also the tuning device. The gear ratio of the two rotations of the wheel R and the shaft A is governed by the relation of the effective lever lengths or leverage of H. A short instant before the drive pin St reaches the end of the transverse slot in MA, H is driven along in longitudinal direction and caused to become disengaged with the teeth of ZK. After St has reached the end of the said slot, as rotation continues, R will directly drive the drive arm MA, and as a result the shaft A conjointly with the tuning device is rotated at high speed.

When making adjustment for tuning, the operation is such that the tuning device is first rotated at high speed beyond the desired value or position, whereupon, at low speed in inverse sense, fine adjustment for tuning is effected by a brief connection of the motor.

No additional friction is required in this arrangement, and the motor is not called upon to deliver a more powerful torque.

We claim:

1. In a device of the kind described, a reversible motor, a rotatable shaft, a gear wheel mounted on but rotatable with respect to said shaft, means for providing a driving connection between the motor and said gear wheel, an arm fixedly mounted on said shaft adjacent said gear wheel, said arm having formed thereon an arcuate slot, a pin fixedly mounted on the face of the gear wheel adjacent the arm, said pin protruding through said slot, a pin mounted on a portion of said arm which is on the side of the slot away from the shaft, a lever device pivoted on said last named pin and having a slot therein cooperating with the protruding portion of the first named pin, means for urging said lever device outwardly with respect to said arm, and means for holding the outer end of said lever device in a fixed position for a part of its range of movement about its pivot point whereby the arm may be adjusted thereby for that part of its movement.

2. In combination, a rotatable driving shaft capable of rotation in either direction, a driven shaft, a wheel mounted on but rotatable with respect to said driven shaft, means providing a driving connection between the driving shaft and said wheel, a disk mounted on and rotatable with said driven shaft, said disk being positioned adjacent said gear wheel and having formed thereon an arcuate slot displaced an appreciable distance away from the driven shaft and substantially concentric with the shaft, a pin mounted on the face of the gear wheel adjacent said disk, said pin being of sufficient length to protrude through said slot an appreciable distance, a pin mounted on said disk an appreciable distance away from said slot on the side of the slot which is away from the shaft and along a line connecting the center of rotation of the disk with an intermediate point of the arcuate slot, a lever device pivoted on said last named pin and having a slot formed along its length for receiving the protruding portion of the first named pin, means for urging said lever device outwardly with respect to said driven shaft, and means for holding the outer end of said lever device in a fixed position for a part of its range of movement about its pivot point to thereby provide for adjusting said disk for that part of the range of movement of said lever device.

FRITZ HARTWIG.
OTTO OEHLING.